Nov. 25, 1958  J. H. GUYTON ET AL  2,862,175
TRANSISTOR CONTROLLED VOLTAGE REGULATOR FOR A GENERATOR
Filed Nov. 15, 1954

INVENTORS
James H. Guyton &
BY Edward G. Rota
R. C. Fowler
ATTORNEY

United States Patent Office 2,862,175
Patented Nov. 25, 1958

2,862,175

TRANSISTOR CONTROLLED VOLTAGE REGULATOR FOR A GENERATOR

James H. Guyton and Edward G. Roka, Kokomo, Ind., assignors to General Motors Corporation, Detroit, Mich., a corporation of Delaware Application November 15, 1954, Serial No. 468,731

4 Claims. (Cl. 322—28)

This invention relates to means for regulating the voltage applied to a power supply line from a power source whose potential is variable. More particularly it relates to a voltage regulating system for automotive vehicles which is powered by a D. C. generator whose speed varies widely and is dependent upon vehicle operation.

At the present time voltage regulating means utilized in automotive systems have mechanical contacts which are spring biased and operated by solenoid coils to provide the desired regulation. These mechanical contacts are a source of system failure and unfavorable operation in that they burn and the accurate initial setting is difficult as well as attempts to maintain the setting over a period of time.

It is an object in making this invention to provide a voltage regulating system having no moving parts.

It is a further object in making this invention to provide a voltage regulating system for a D. C. generator including a transistor control for the field of the generator to vary the current flow therethrough dependent on the line voltage.

With these and other objects in view which will become apparent as the specification proceeds, our invention will be best understood by reference to the following specification and claims and the illustrations in the accompanying drawings, in which:

In theory all of these systems utilize a variation in bias on a transistor caused by fluctuations in line voltage to vary the flow of current through the field winding of a generator to counteract the voltage change.

Figure 1:
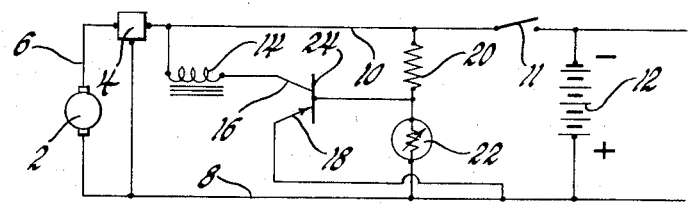
Figure 1 is a circuit diagram of a voltage regulating system embodying our invention.

Referring now more particularly to Figure 1, there is shown therein a D. C. generator 2 such as that used in an automobile, and whose speed varies widely during normal car operation. A cutout 4 is provided which is connected to lines 6 and 8 extending from the generator. A power supply line 10 is also connected to the cutout 4. The cutout prevents the output of the generator from being applied to the power supply lines until the voltage of the generator equals the line voltage. The storage battery 12 of the vehicle is connected across lines 8 and 10. A control switch 11 is inserted in line 10 to turn the system off. The field winding 14 of the generator has one end connected directly to line 10 and the opposite end to the collector electrode 16 of the transistor. The emitter electrode 18 of the transistor is connected directly to the line 8. A resistance 20 and an element having negative dynamic resistance characteristics 22, which may be for example a varistor, are serially connected across the supply lines 8 and 10. The base 24 of the transistor is connected to a point intermediate resistance 20 and varistor 22.

In the operation of this system, the ignition switch 11 is closed which applies battery voltage across the field 14 and transistor in series to produce a flow of current in said field of considerable strength so that the output of the generator 2 will build up quickly. There is at this time a flow of current through the series circuit formed of resistor 20 and negative resistance or varistor 22 to provide a certain bias voltage at the base 24. The generator now builds up its output operating the cutout to close the circuit to line 10. Assuming that the line voltage from the generator now exceeds the battery voltage to increase the voltage applied across the two resistors 20 and 22, the current flow through this circuit will increase. However, the negative characteristic of varistor 22 will change the proportionate drop through the two to change the base current or bias in the transistor to reduce the current flow through the field 14 and reduce the generator output to counteract the rising voltage and give regulation.

Figure 2:
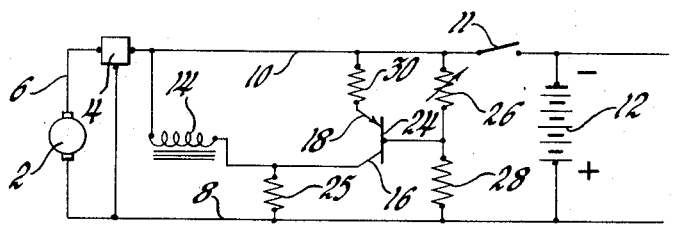
Figure 2 is a circuit diagram of a modified form of our invention.

In Figure 2, like parts have been designated by the same reference characters which identified them in Figure 1. The field 14, however, is, as before, connected between line 10 and the collector electrode 16 of the transistor, but in addition one terminal is connected through resistor 25 to line 8. The emitter electrode 18 is connected through resistor 30 to the power supply line 10. A variable resistance 26 is connected in series with a resistor 28 across lines 8 and 10 and base 24 is directly connected to a point intermediate resistors 26 and 28.

It is obvious that in the form shown in Figure 2 the transistor is in shunt with the field and by changing the flow of current through the transistor, the field current may be controlled. The variable resistor 26 is adjusted to give substantially zero base current in the transistor with only the battery voltage applied and switch 11 closed. However, when the line voltage increases above the original battery voltage, the base bias increases to increase the flow of base current diverting current from the field coil circuit and reducing the field current to reduce the generated voltage and obtain the desired regulation. The adjustment of the resistor 26 determines the value of voltage to which the system is to be regulated.

Figure 3:
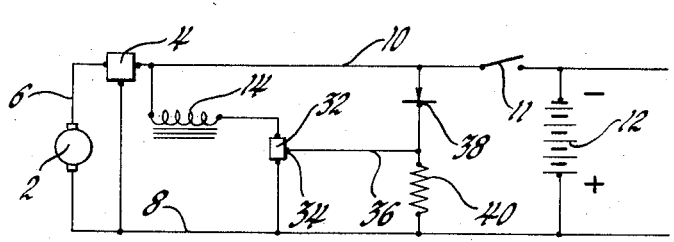
Figure 3 is a circuit diagram of a control system embodying a different type of transistor.

In Figures 1 and 2 junction type transistors have been disclosed and described. However, unipolar transistors may also be used, and Figure 3 discloses a system for voltage regulation using a transistor of this type. As in the previous figures a generator 2 supplies power to lines 8 and 10 through a cutout 4 and when switch 11 is closed the battery 12 is also connected across the lines. A unipolar transistor is similar to an electron tube in that the current flow through the crystal is controlled by voltage applied to a gate junction. The field 14 is connected to the line 10 and to one ohmic contact of a transistor 32, the other ohmic contact being connected to line 8. The control junction 34 on the transistor is connected by line 36 to a point intermediate a rectifying diode 38 and a resistor 40, the opposite terminals of which are connected to lines 10 and 8 respectively. The diode rectifier 38 is connected to normally prevent flow through the resistor and is of the type known as a Zener diode which breaks down upon the application of a higher voltage than that for which it is designed, and current may flow through it in the reverse direction. However, upon restoring normal voltage or less, it recovers its rectifying action with no damage having been done to it.

In the operation of this system, when the switch 11 is closed, the field winding is placed across the lines 10 and 8 in series with the transistor 32. The unipolar transistor performs much like a triode vacuum tube in that the current flow through the transistor is controlled by the voltage on control contact 34. At the start the voltage of this contact is low with respect to line 8 so that a large current flows through the transistor and field and the generator builds up its output to actuate the cutout 4 and apply its output to the lines 10—8. If the voltage tends to increase above a certain value, say 14 volts in a 12 volt system, then the Zener diode will break down to conduct in the opposite direction. This increases the negative potential at the top of resistance 40 with respect to line 8, and therefore the potential at control contact 34. This in turn cuts down the conductivity of the transistor and the current flow through the field to reduce the generator voltage. Upon reduction of this voltage below the defined amount, the Zener diode will recover and cease passing current in the reverse direction and the control contact voltage will increase. This provides the desired voltage regulation.

Figure 4:
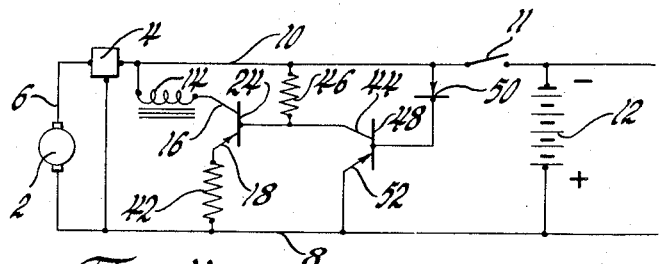
Figure 4 is a circuit diagram of a modified form of control circuit utilizing amplification.

The control system illustrated in Figure 4 may be termed a two-stage control system as two transistor stages are used, the second providing amplification. This system also utilizes a Zener diode described in relation to Figure 3. In Figure 4 the field 14 is connected between line 10 and the collector electrode 16 of a junction transistor. The emitter electrode 18 of the transistor is connected through a low resistance 42 to line 8. The base 24 of the transistor is directly connected to the collector electrode 44 of a second transistor. A resistor 46 is connected between line 10 and collector electrode 44. The base 48 of the second transistor is connected through a Zener diode 50 to line 10. The emitter electrode 52 of the second transistor is directly connected to line 8.

In this circuit of Figure 4, when ignition switch 11 is closed and the generator started, the current through the field coil 14 as controlled by the first transistor will be relatively large, and the generator output will build up rapidly. At this time there is very little flow of current through the second transistor so the bias on base 24 is high to provide a relatively large current flow. When the generator voltage is applied to the lines 8 and 10 and increases above the desired level and above the reverse current breakdown point of the diode 50, the breakdown current flows into base 48 of the second transistor. This allows a current to flow through resistor 46, to collector 44, and to emitter 52, which reduces the negative bias voltage on base 24 of the first transistor. This reduction of bias results in a reduced base current in the first transistor, and this in turn results in a reduced collector to emitter current in this transistor. Since the generator field is in this circuit, less field current flows and a reduction in generated voltage results. As soon as the voltage on lines 10 and 8 is reduced below a desired point, the Zener diode will cease to conduct in the reverse direction and the bias will again change on the base 24 to provide regulation.

We claim:

1. In an electrical system, a direct current generator having an output circuit and energizing field, power lines connectible to said output circuit, a transistor having a base, emitter and collector electrodes, said emitter and collector being connected in series circuit with said field across said power lines, a rectifier and a second transistor network connected across said power lines the base of said first transistor being connected to an electrode of said second transistor, said rectifier connected in such relation as to prevent flow of current from the high voltage line to the low to apply a bias to said base.

2. In an electrical system, a direct current generator having an output circuit and an energizing field, power lines connectible to said output circuit, a transistor having a base, emitter and collector electrodes, said emitter and collector being connected in series circuit with said field across said power lines, a rectifier and a second transistor network connected across said power lines, said rectifier connected in such relation as to prevent flow of current from the high voltage line to the low, means connecting the base of the first transistor to an electrode of said second transistor to apply a bias to said base, and a direct current source of constant voltage connected across said power lines.

3. In an electrical system, a direct current generator having an output circuit and an energizing field, power lines connectible to said output circuit, a transistor having a base, emitter and collector electrodes, said emitter and collector being connected in series circuit with said field across said power lines, a rectifier and a second transistor network connected across said power lines, said rectifier connected in such relation as to prevent flow of current from the high voltage line to the low, means connecting the base of the first transistor to an electrode of said second transistor to apply a bias to said base, a direct current source of constant voltage connected across said power lines, and interconnecting means between the power lines and the generator output circuit preventing flow from the power lines to the generator but providing flow from the generator to the power lines when the generator voltage exceeds a given value.

4. In an electrical system, an electrical generator having an output circuit and an energizing field, power lines connected to said output circuit, a pair of transistors connected in cascade, each transistor being connected across the power lines with one transistor controlling the bias of the other transistor, said energizing field being connected in series with said other transistor, and having its current controlled by the flow through said other transistor as adjusted by said one transistor and a rectifier of the Zener diode type connected between the one transistor and one power line in such a relationship as to prevent flow of current from the high voltage line to the low voltage line to bias said one transistor to give a desired response characteristic to ranges of voltage change on said power lines.

References Cited in the file of this patent

UNITED STATES PATENTS

| | | |
|---|---|---|
| 1,434,869 | Wold et al. | Nov. 7, 1922 |
| 2,579,816 | Gluyas | Dec. 25, 1951 |
| 2,620,448 | Wallace | Dec. 2, 1952 |
| 2,698,416 | Sherr | Dec. 28, 1954 |
| 2,751,545 | Chase | June 19, 1956 |
| 2,751,549 | Chase | June 19, 1956 |
| 2,751,550 | Chase | June 19, 1956 |
| 2,779,382 | Jensen | Jan. 1, 1957 |

FOREIGN PATENTS

| | | |
|---|---|---|
| 422,604 | Great Britain | Jan. 15, 1935 |